(12) United States Patent
Damkjær

(10) Patent No.: US 6,857,517 B2
(45) Date of Patent: Feb. 22, 2005

(54) FLEXIBLE CONVEYOR

(75) Inventor: Poul Erik Damkjær, Vejle (DK)

(73) Assignee: PED Invest A/S, Vejle Øst (DK)

( * ) Notice: Subject to any disclaimer, the term of this patent is extended or adjusted under 35 U.S.C. 154(b) by 0 days.

(21) Appl. No.: 10/680,427

(22) Filed: Oct. 8, 2003

(65) Prior Publication Data

US 2004/0084286 A1 May 6, 2004

(30) Foreign Application Priority Data

Oct. 8, 2002 (DK) .......................................... 2002 01510

(51) Int. Cl.$^7$ .............................................. B65G 21/00
(52) U.S. Cl. .................................................. 198/861.2
(58) Field of Search .............................. 198/861.2, 594, 198/841

(56) References Cited

U.S. PATENT DOCUMENTS

| | | | | |
|---|---|---|---|---|
| 2,701,050 A | * | 2/1955 | Steinborn .................... | 198/713 |
| 3,707,218 A | * | 12/1972 | Payne et al. ................ | 198/838 |
| 3,920,115 A | * | 11/1975 | Craggs ........................ | 198/822 |
| 3,934,708 A | * | 1/1976 | Kambara .................... | 198/833 |
| 4,144,965 A | * | 3/1979 | Alldredge et al. .......... | 198/838 |
| 4,205,745 A | * | 6/1980 | VanLingen .................. | 198/703 |
| 4,618,057 A | * | 10/1986 | Howser ...................... | 198/861.2 |
| 4,844,238 A | * | 7/1989 | Lachner ..................... | 198/861.2 |
| 4,865,185 A | * | 9/1989 | Bodimer .................... | 198/861.2 |
| 6,651,804 B2 | * | 11/2003 | Thomas et al. ............. | 198/594 |
| 6,705,461 B2 | * | 3/2004 | Kuharevicz et al. ...... | 198/861.1 |

FOREIGN PATENT DOCUMENTS

GB          1146895          3/1969

* cited by examiner

*Primary Examiner*—Richard Ridley
(74) *Attorney, Agent, or Firm*—James Creighton Wray; Meera P. Narasimhan

(57) ABSTRACT

The present invention relates to a flexible conveyor comprising a carrying structure and a conveyor belt where the upper side is defined by the loading surface of the conveyor belt.

The invention provides a flexible conveyor comprising a carrying structure and a conveyor belt where the upper side is defined by the conveyor belt loading surface characterised in that the carrying structure comprises a load-carrying chain where each link in the chain on its upper side comprises conveyor belt support means, and on its underside conveyor belt guidance means, and that each load-carrying chain link is articulately joined for movement in three dimensions relative to the adjacent links and further that the conveyor belts loading surface is supported by the conveyor belt support means, and further that means are provided in each end of the flexible conveyor about which the conveyor belt is guidably turned.

8 Claims, 3 Drawing Sheets

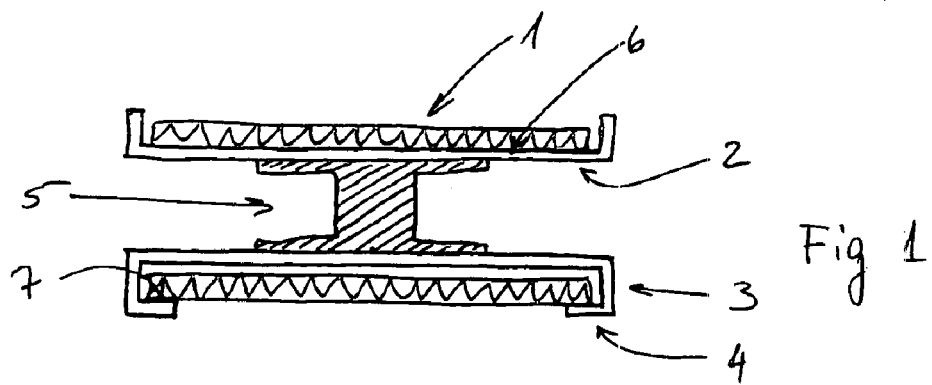
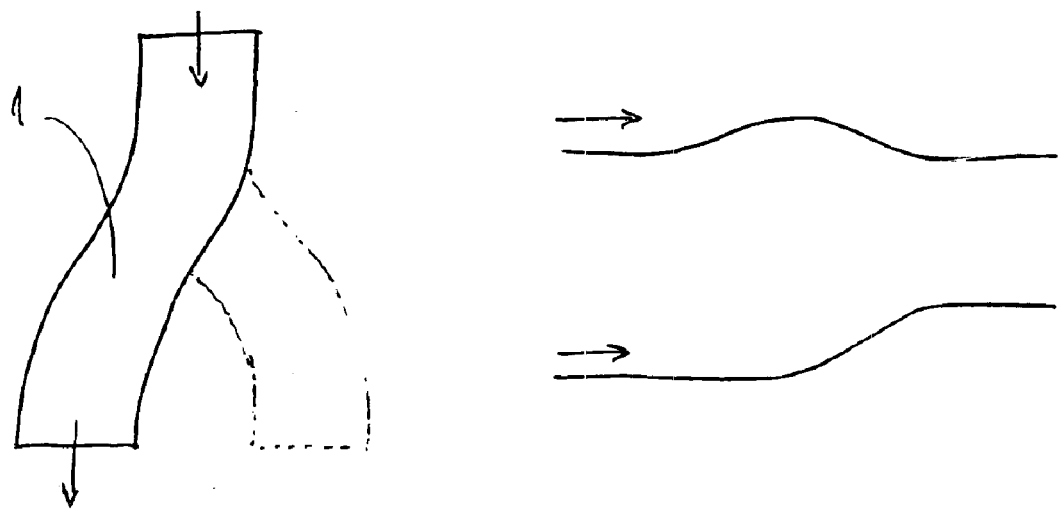
Fig 2
Fig 3

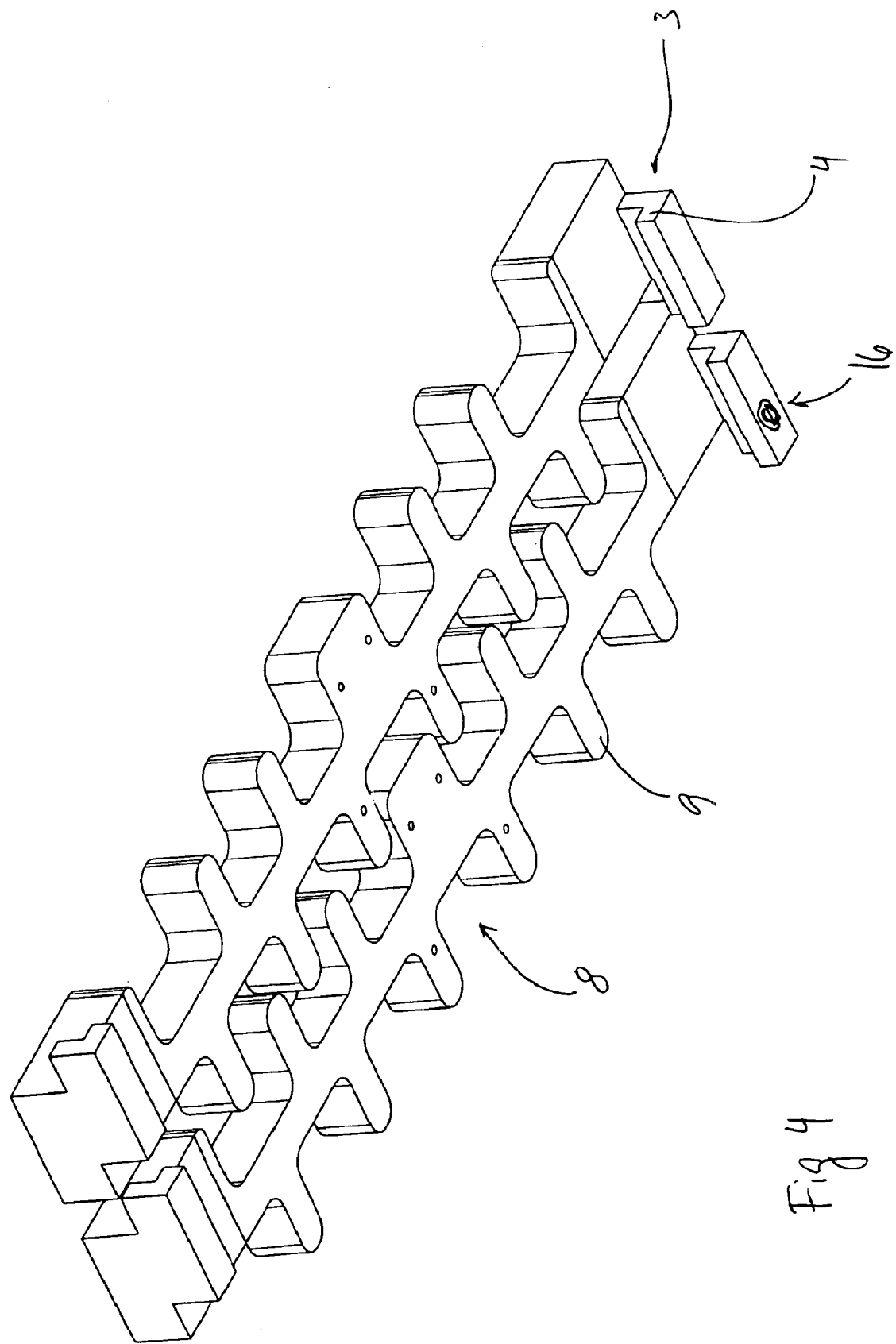

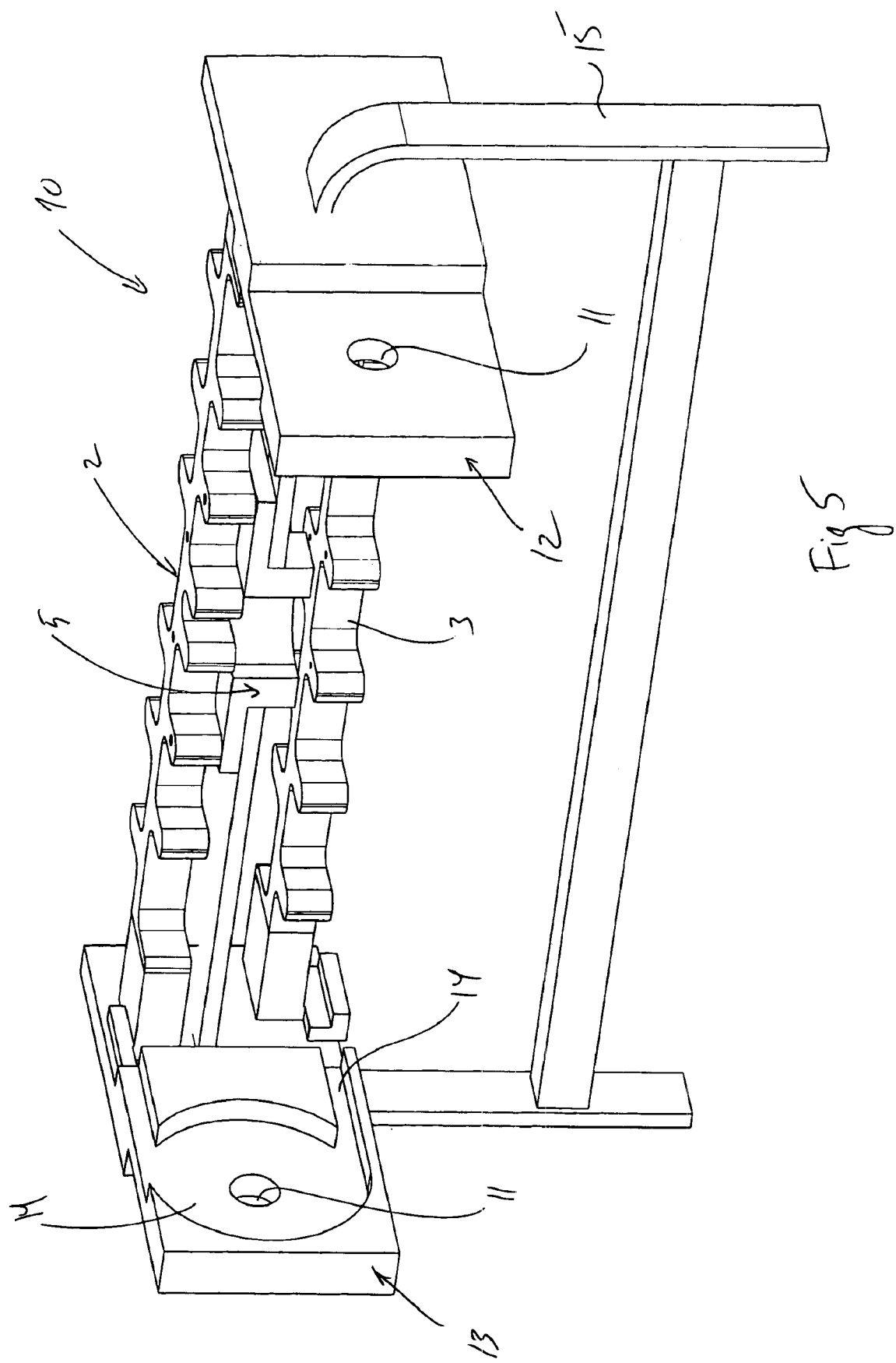

FLEXIBLE CONVEYOR

This application claims the benefit of Danish Application No. 2002 01510 filed Oct. 8, 2002.

BACKGROUND OF THE INVENTION

The present invention relates to a flexible conveyor comprising a carrying structure and a conveyor belt where the upper side is defined by the loading surface of the conveyor belt.

A typical conveyor comprises a carrying structure which is a structure around which the belt is arranged. The carrying structure is usually made up of a stiff construction, for example made from steel, defining the path along which the conveyor belt will have to travel. In order to be able to convey goods on the conveyor belt, the carrying structure comprises a support structure for the belt so that the belt will be able to travel in a substantially horizontal or slightly inclined forward direction.

The conveyor belt can be in the shape of any suitable belt construction. If it is desirable to have a conveyor which conveys goods in a straight line, but at different levels, conveyor belts made from a plastic material can be used, optionally reinforced with glass fibres or plastic fibres.

In other applications where the conveyor belt needs to convey goods through, for example, an S-shaped curve, it is necessary to use side-flexing conveyor belts. Side-flexing conveyor belts usually consist of a number of interconnected chain links which are interconnected by means of pins. The adjacent chain links having usually oval-shaped apertures in protrusions which apertures are brought into overlapping relationship with apertures in an adjacent chain link in such a way that the pin can be inserted and thereby connect with an adjacent chain link in a hinge-like manner. These conveyor belts are naturally also usable in conveyors for straight lines where there is a change in elevation during the travel course of the conveyor belt.

Both of the above-mentioned types can be used in production lines where the goods need to be conveyed from one fixed process station to another fixed process station. If, however, the goods for one reason or the other, need to be sorted so that one type of goods goes in one direction and another type of goods goes in the second direction, a branch or switch is built into the conveyor system whereby it will be possible to direct the goods being conveyed on the conveyor onto a second or third conveyor according to the sorting criteria.

The total conveyor system from the first station to the secondary stations thereby becomes complex and expensive. Furthermore, if a change in the production line is desired, the entire conveyor needs to be rebuilt or replaced by a new conveyor system.

In some applications, fixed conveyor belts are being used although flexible conveyor systems which substantially improve both production and the working environment surrounding the conveyor could be used.

One such application is loading and unloading of items from cargo bays on air planes and other relatively small spaces. At present unloading is done by manually lifting the item, for example a suitcase, from its position in the loading bay and onto the conveyor belt. The height in a typical civil commuter plane is between 90 and 150 cm which puts a strain on the back of the person lifting the suitcases from the loading bay and onto the conveyor. The conveyor system is usually mounted on a vehicle and is of the type of a straight-line conveyor belt bringing the item from the loading bay to a lower level where the item is transferred, for example to a truck for transporting it further onto luggage distribution vehicles, or vice versa.

Furthermore, the traditional type of conveyor used for unloading air planes can only reach a limited distance into the loading bay. The distance from the opening of the loading bay to the back of the loading bay can in some air planes be from eight up to ten metres. In order to bring the items, usually luggage, from the back of the loading bay to the conveyor arranged in the opening of the loading bay, sliding carpets or an additional small conveyor must be brought into the loading bay area. This requires a further cumbersome routine and requires the continual redoing of the conveying structure as the luggage is unloaded from one end whereby the distance to convey increasingly becomes longer.

In other applications, for example where goods need to be sorted as explained above or where goods need to be loaded or unloaded from trucks at a loading bay, there is consequently a need for a flexible conveyor which is easily adjustable both sideways and in elevation.

SUMMARY OF THE INVENTION

The present invention addresses this problem by providing a flexible conveyor wherein the carrying structure comprises a load-carrying chain where each link in the chain on its upper side comprises conveyor belt support means, and on its underside comprises conveyor belt guidance means, and that each load-carrying chain link is articulately joined for movement in three dimensions relative to the adjacent links, and further that the loading surface of the conveyor belt is supported by the conveyor belt support means, and further that means are provided at each end of the flexible conveyor about which the conveyor belt is guidebly turned.

In the inventive flexible conveyor according to the invention, the backbone of the conveyor is a load-carrying chain which chain is made in such a way that each chain link itself can be bent and turned within limits in any desired direction. As each link in the chain comprises means on its upper side for guiding, the conveyor belt and means on its underside for carrying and guiding the conveyor belt on its return trip, each chain link is a separate carrying structure.

In a further advantageous embodiment of the invention, the chain links of the load-carrying chain are moulded as an integral part of the conveyor belt support means and the conveyor belt guidance means. Advantageously, the moulded object can be made from a plastic material.

The flexible conveyor according to the invention can furthermore be equipped with two or more sets of adjustable support legs which can be attached to the load-carrying chain. As the load-carrying chain comprises means for both guiding and supporting the conveyor on its upper surface as well as conveyor belt guidance means on its underside, the legs can advantageously be attached to the load-carrying chain. The load-carrying chain has a certain stiffness such that it is not necessary to support each and every chain link.

The adjustable support legs can for example be adjustable by means of a telescopic arrangement driven by pneumatic or hydraulic means, or a linear electric motor. Also any mechanical means manually adjusting the elevation of the conveyor can be applied to the present invention.

The support legs or any other suitable support structure which is attached to the conveyor can be equipped with wheels or other means for sliding the end of the support legs across a surface on which the conveyor is supported.

In a further advantageous embodiment one or more of the conveyor belt support means projecting from its underside comprise roller means or ball means for slidingly supporting at least part of the conveyor. This embodiment is especially advantageous for use in loading bays of air planes, trucks, and the like where it can be advantageous to have the conveyor slidingly placed on the floor of the cargo bay. The rollers or balls make for very easy handling of the conveyor as it can be pushed/dragged manually into the most advantageous position in relation to the items, for example luggage, which need to be transferred onto the conveyor. Because of the flexibility built into the conveyor by means of the carrying chain, it is possible to side-flex the conveyor belt around fixed obstacles placed in the cargo bay so that even the furthest regions of the loading bay area can be reached with the conveyor according to the invention.

In a further advantageous embodiment, sides connecting the edges of the conveyor belt support means with the conveyor belt guidance means of each chain link are provided. These sides make it possible in this further advantageous embodiment to increase the load on the upper side of the conveyor as part of the load is being transferred directly through the sides down to the guidance means which then can transfer the load, either to the chain link itself, or to support means attached to that particular chain link.

In a still further advantageous embodiment of the invention the conveyor belt support means and the conveyor belt guidance means in the longitudinal plane of the conveyor comprises recesses and protrusions so that protrusions on one chain link fit within a recess in an adjacent chain link.

In this configuration it is possible for the chain links to articulate independently of the adjacent chain link and still maintain a large supporting surface since the support surface of one link overlaps with the supporting surface of the adjacent chain link. The size of the protrusions and the size of the recesses gives the conveyor according to the invention a large degree of freedom to articulate in all three dimensions without sacrificing any load-bearing capabilities as the conveyor belt to a large degree is supported on its entire surface.

In a still further advantageous embodiment, the means provided at each end of the flexible conveyor about which the conveyor belt is guidably turned, comprises side members on the inner side of which a track is formed for guiding the conveyor belt. This track can for example be in the form of a groove having a curved shape whereby the conveyor belt is guided inside the groove to a turn at the end of the conveyor. Alternatively a flange can be provided in the side members for supporting and guiding the conveyor belt through the turn.

The means for guiding the conveyor belt around the turn mainly serves two purposes. Firstly, it ensures that no buckling will occur in the conveyor belt when it goes through the turn at the end of the conveyor, and secondly it alleviates some of the slack arising during use of the belt.

By using for example side-flexing belts such as Uniflex SNB side-flexing provided by uni-chains A/S, Denmark, the distance between two belt links in the conveyor belt when being pulled on the upper side will be longer than the distance between two chain links on the under side when they are pushed back to the beginning of the belt. The difference in length can be up to 40%. In addition to this, an additional 10% difference can occur due to wear in the belt construction. The guidance means provided on the inside of the sides helps to forcibly push the conveyor belt chain links together so that no buckling occurs in the conveyor due to the flexible length of the conveyor belt.

In a still further advantageous embodiment of the invention, the conveyor belt is driven by a pinion drive engaging the belt adjacent to at least one of the means arranged at each end of the conveyor. By having a simple engagement with the openings in the conveyor belt a very direct transmission is provided. When these means are furthermore cooperating with the guidance means for guiding the conveyor belt through the turn, undesired buckling of the belt can be avoided, even under high loads.

Although the invention as described above only comprises one drive motor, it is evident that the conveyor can be used for reversible tasks as well by arranging a second motor used at the other end of the conveyor belt. This is especially useful in a number of applications, for example for loading and unloading cargo bays in airplanes and the like in that first the luggage has to be loaded onto the plane and thereafter the luggage has to be unloaded.

The invention is explained below with reference to the accompanying drawing wherein

BRIEF DESCRIPTION OF THE DRAWINGS

FIG. 1 schematically illustrates a cross-section through an inventive conveyor according to the invention.

FIG. 2 illustrates a conveyor according to the invention where the conveyor can be flexed.

FIG. 3 illustrates a schematic conveyor path.

FIG. 4 illustrates a schematic conveyor path.

FIG. 5 illustrates an end section of a conveyor.

DETAILED DESCRIPTION OF THE PREFERRED EMBODIMENTS

FIG. 1 schematically illustrates a cross-section through an inventive conveyor according to the invention. On the upper side of the structure the conveyor belt 1 is supported by conveyor belt support means 2. On the underside of the conveyor, conveyor belt guidance means 3 are provided. These guidance means 3 comprise a flange 4 which supports the conveyor belt when it is travelling back to the beginning of the conveyor. The load-carrying structure 5 comprises a load-carrying chain consisting of a number of interconnected chain links. The chain links in the load-carrying structure are interconnected in such a way that they can articulate in all three dimensions.

As is evident from the schematic presentation in FIG. 1, the conveyor belt support means as well as the conveyor belt guidance means are exposed to wear. When the conveyor belt for example is of the type SNB Flexible Belts® provided by uni-chains A/S, Denmark, the belt is advantageously made from a mouldable plastic material. In order to minimise the wear on the carrying structure, the surfaces exposed to wear, i.e. surface 6 on the conveyor belt support means as well the upper sides 7 of the flanges 4 can be provided with a wear-resistant material as for example Nylon®, Delarin®, or a similar material.

Due to the articulate connections between the load-carrying chain links 5 and the flexibility provided by the conveyor belt 1 it is possible for the entire conveyor to flex in all three dimensions.

FIG. 2 illustrates a conveyor according to the invention where the conveyor can be flexed between the situation in which it is shown, and the situation illustrated by phantom lines.

Again, due to the articulate connection between the chain links making up the carrying structure, also differences in elevation, as illustrated FIG. 3, can be overcome with the conveyor according to the invention. Any combinations of flexibility as illustrated in FIG. 2 and FIG. 3 or any other desired path for the conveyor can be provided with a conveyor according to the invention.

FIG. 4 illustrates the underside of the carrying structure where the conveyor belt guidance means are evident. The conveyor belt is not illustrated in this figure, but only the conveyor belt guidance means are illustrated.

In order to provide a flexible construction and at the same time a large load-supporting surface, each link in the load-carrying chain is provided with conveyor belt guidance means at the underside. The guidance means 3 comprise recesses 8 and protrusions 9. When the load-carrying chain is assembled, the protrusions 9 will fit inside recesses 8 in an adjacent chain link. In this manner, the load-carrying surface of one chain link is extended into the load-carrying surface of the adjacent chain link so that an overlap between one chain link and the adjacent chain link will occur whereby an even and smooth transition of the conveyor belt is effected. By making the recesses substantially larger than the protrusions 9 it is possible for one chain link to articulate relative to an adjacent chain link.

In FIG. 5, an end section of a conveyor according to the invention is illustrated. The conveyor belt is not shown. The conveyor belt support means and the conveyor belt guidance means are integral parts of the end section 10 of a conveyor. Between the two end side sections 12,9 a roller can be fitted in the two apertures 11 for turning the conveyor belt. On the inside of a side section 13 a groove 14 is provided for guiding the conveyor belt through the turn.

Furthermore, support means in the shape of legs 15 are illustrated as being connected to the side members 12,13. These support means 15 can be adjustable. The adjustable means are not illustrated but can have any shape suitable for the actual application, for example a telescopic hydraulic or pneumatic cylinder, telescopic means activated by a linear electric motor or any manual means suitable for height adjustment. At the end of the legs, rollers can be provided for assisting and flexing the conveyor from side to side.

Likewise, turning back to FIG. 4, a ball means 16 is illustrated projecting from the underside of the guidance means whereby, when the conveyor is placed on a flat surface, for example the floor of a loading bay in an air plane, it is possible to slide the entire conveyor on a number of ball means 16, as illustrated.

With the present invention a conveyor is provided which is flexible in three dimensions whereby for certain applications it will be possible to replace a number of conveyors with one flexible conveyor according to the present invention. Furthermore the conveyor according to the invention is especially useful for use in loading bays of air planes or other limited spaces where ordinary conveyors are unable to reach. Although the invention has been explained with reference to cargo bays and production processes, the conveyor per se is not limited to these applications, but is only limited by the definition set out in the appending claims.

What is claimed is:

1. Flexible conveyor comprising a carrying structure and a conveyor belt where the upper side is defined by the conveyor belts loading surface, wherein the carrying structure comprises a load-carrying chain, where each link in the chain on its upper side comprises conveyor belt support means, and on its underside conveyor belt guidance means, and wherein each load-carrying chain link is articulately joined for movement in three dimensions relative to the adjacent links and wherein the loading surface of the conveyor belt is supported by the conveyor belt support means, and wherein means are provided in each end of the flexible conveyor about which the conveyor belt is guidably turned.

2. Flexible conveyor according to claim 1, wherein the chain links of the load-carrying chain are integral with the conveyor belt support means and the conveyor belt guidance means, and wherein it is made from a moldable plastic material.

3. Flexible conveyor according to claim 1, wherein two or more sets of adjustable support legs can be attached to the load-carrying chain.

4. Flexible conveyor according to claim 1, wherein one or more of the conveyor belt support means projecting from its underside comprises roller means or ball means for slidingly supporting at least part of the conveyor.

5. Flexible conveyor according to claim 1, wherein at both sides of the conveyor connecting the edges of the conveyor belt support means with the conveyor belt guidance means of each chain link sides are provided.

6. Flexible conveyor according to claim 1, wherein the conveyor belt support means and the conveyor belt guidance means in the conveyor's longitudinal plane comprises recesses and protrusions, such that protrusions on one chain link fits within a recess in an adjacent chain link.

7. Flexible conveyor according to claim 1, wherein the means provided at each end of the flexible conveyor about which the conveyor belt is guidably turned, comprises side members on the inner side of which a track is formed for guiding the conveyor belt.

8. Flexible conveyor according to claim 1, wherein the conveyor belt is driven by a pinion drive engaging in the belt adjacent to at least one of the means arranged at each end of the conveyor.

* * * * *